UNITED STATES PATENT OFFICE.

JOHN A. BAZILLE AND GEORGE W. PARTRIDGE, OF ST. PAUL, MINNESOTA.

CLEANING COMPOUND.

SPECIFICATION forming part of Letters Patent No. 507,473, dated October 24, 1893.

Application filed April 7, 1893. Serial No. 469,406. (No specimens.)

*To all whom it may concern:*

Be it known that we, JOHN A. BAZILLE and GEORGE W. PARTRIDGE, of St. Paul, in the county of Ramsey and State of Minnesota, have invented certain new and useful Improvements in Cleaning Compounds; and we do hereby declare the following to be a full, clear, and exact description of the invention, such as will enable others skilled in the art to which it appertains to make and use the same.

Our invention relates to an improved wall cleaning compound, which is adapted for cleaning papered, tinted, or frescoed walls.

The object of our invention is to provide a cheap and simple compound, which can be easily prepared and molded or shaped into cakes or blocks, of a consistency about the same as fresh bread, so that, by rubbing the face of the wall, with said cake or block, all grease, dirt, smoke, or dust or other accumulations will be removed without impairing the texture or shade of the wall covering.

Our invention consists of a mixture of flour, sal soda or other alkali compound, olive oil, blue vitrol, Venetian red, and water, all mixed in the manner and proportions hereinafter specified.

In preparing our improved cleaning block or cake, we use one pound of wheat flour, to which we add three ounces of sal soda. Ten drops of olive oil are then put in, and to this mixture are added ten drops of blue vitriol. One eighth of an ounce of Venetian red is then added, and this entire mass is stirred well. One pound of fresh water is then poured in, and the composition is kneaded like dough, until the various ingredients have been thoroughly mixed, and a homogeneous mass produced. The dough like mass thus produced, is then placed in a dry clean cooker, and heated until it becomes the consistency of fresh bread. All moisture is excluded from the cooker to prevent moisture in the block or cake. After the mass has been baked the desired length of time, it is taken out and is ready for use, or it can be kept for an indefinite length of time.

By rubbing the block or cake over the soiled wall, the dust will quickly disappear, and the wall be left clean and unimpaired.

Having thus described our invention, what we claim is—

1. An improved cleaning compound consisting of flour, sal soda, olive oil, blue vitriol, Venetian red, and water, all mixed in the proportions specified.

2. An improved cleaning compound consisting of flour, sal soda, olive oil, blue vitriol, Venetian red, and water, mixed in the manner and proportions specified, and then cooked dry, substantially as described.

In testimony whereof we have signed this specification in the presence of two subscribing witnesses.

JOHN A. BAZILLE.
GEORGE W. PARTRIDGE.

Witnesses:
E. J. CANNON,
L. A. STRAIGHT.